(12) United States Patent
Golomb

(10) Patent No.: US 8,198,996 B2
(45) Date of Patent: Jun. 12, 2012

(54) INTEGRATED VEHICLE TURN SIGNAL SYSTEM AND APPARATUS

(76) Inventor: Adam Simon Golomb, Chicago, IL (US)

( * ) Notice: Subject to any disclaimer, the term of this patent is extended or adjusted under 35 U.S.C. 154(b) by 420 days.

(21) Appl. No.: 12/555,477

(22) Filed: Sep. 8, 2009

(65) Prior Publication Data

US 2011/0057785 A1     Mar. 10, 2011

(51) Int. Cl.
*B60Q 1/34* (2006.01)
(52) U.S. Cl. ......... 340/475; 340/465; 340/468; 340/471
(58) Field of Classification Search .................... 340/475
See application file for complete search history.

(56) References Cited

U.S. PATENT DOCUMENTS

| | | | | |
|---|---|---|---|---|
| 1,651,540 | A | * 12/1927 | Park | ............... 340/465 |
| 2,068,632 | A | 1/1936 | Stites | |
| 2,291,159 | A | 7/1942 | Jacobi | |
| 4,567,217 | A | 1/1986 | Yamazaki et al. | |
| 5,198,629 | A | 3/1993 | Hayashi et al. | |
| 5,614,884 | A | 3/1997 | Evans | |
| 5,666,102 | A | 9/1997 | Lahiff | |
| 5,762,853 | A | 6/1998 | Harris et al. | |
| 5,823,666 | A | * 10/1998 | Kingsolver | ............... 362/488 |
| 6,144,297 | A | * 11/2000 | Donner | ............... 340/475 |
| 6,961,644 | B2 | 11/2005 | Mercier et al. | |
| 2006/0044129 | A1* | 3/2006 | Patel | ............... 340/475 |

OTHER PUBLICATIONS

"Hands-On: A Practical Measure of the Perceived Risk of the Driving Context," J.A. Thomas & D. Walton Opus Central Laboratories; Transit NZIHT 7th Annual Conference, pp. 1-10, 2005.

"A Large-Area, Flexible Pressure Sensor Matrix With Organic Field-Effect Transistors for Artificial Skin Applications," Takao Someya et al; PNAS Jul. 6, 2004, vol. 101, No. 27, pp. 9966-9970.
"Luna Innovations Fiber Optic Pressure Sensor," Trevor Rice, Luna Innovations (4 pages), Nov. 11, 2005.
Web page printout 5 DOF Haptic Wand/Speciality (1 page), 2005.
RLP Engineering, Intelliturn "A Brief History of Turn Signals"/ www.rlpengineering.com/history.htm (2 pages), 2008.
Tapecon Membrane Switch Division, Tapecon, Inc.; product/marketing brochure (16 pages), Apr. 3, 2006.
SmartMotorist.com, "Where to Put Hands on the Steering Wheel?", (4 pages), 2009.
Master Molded Products Corporation; In-Mold Technology, product/ marketing brochure (6 pages), 2009.
International Search Report and the Written Opinion of the International Searching Authority, Oct. 25, 2010.

* cited by examiner

*Primary Examiner* — George Bugg
*Assistant Examiner* — Kerri McNally
(74) *Attorney, Agent, or Firm* — Reed Smith, LLP

(57) ABSTRACT

The present provides a system which integrates motor vehicle turn signal operation into actuators located in the rim of a motor vehicle steering wheel. The actuators of the system of the present invention, one for controlling the right-hand turn signal and one for controlling the left-hand turn signal, are located in an arc segment of the steering wheel defined by the three o'clock and 12 o'clock positions for the right-hand actuator and the nine o'clock and 12 o'clock positions for the left-hand actuator. The actuators may operate in parallel with a conventional stalk switch and only turn on the respective turn signal lights when activated and subsequently depressed. The turn signal lights turn off when the actuators are released. The integrated turn signal system of the present invention further provides for turn signal operation which does not require a driver to remove his or her hands from the steering wheel.

20 Claims, 13 Drawing Sheets

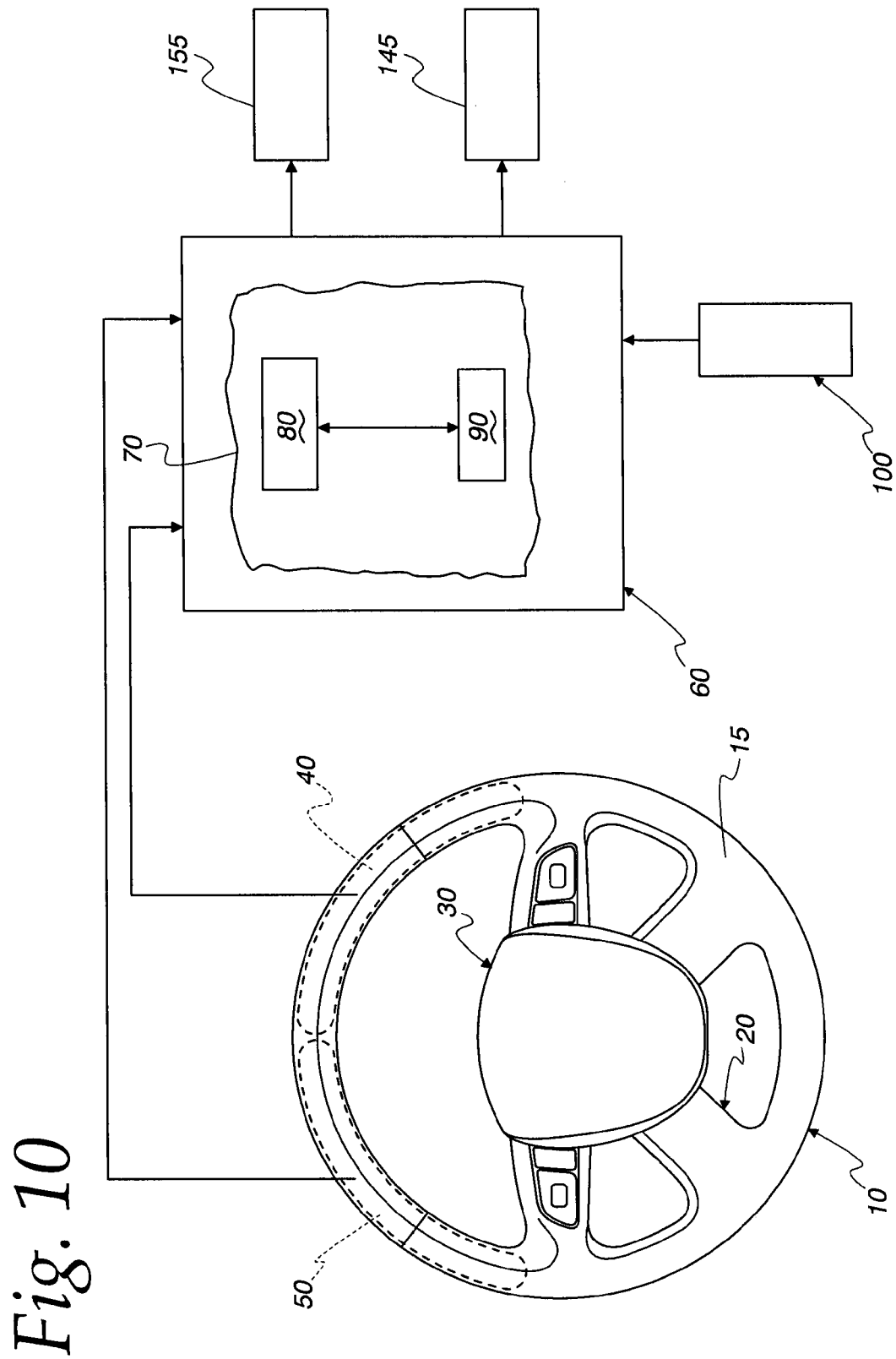

INTEGRATED VEHICLE TURN SIGNAL SYSTEM AND APPARATUS

FIELD OF THE INVENTION

The present invention relates to a turn signal apparatus that is integrated into the rim of a vehicle's steering wheel in such a way as to be fully operable without a driver being required to remove his/her hands from the steering wheel.

BACKGROUND OF THE INVENTION

Vehicle turn signals, while having been in use on commercially available motor vehicles for about 70 years, have changed little since their first application. A vehicle steering wheel is commonly comprised of a column, central hub and annular ring with various components including a turn signal activation switch or switches. Typically turn signal lights are operated by a "stalk switch" or lever located to one side of the steering wheel. The stalk switch is moved upward to signal a right-hand turn and downward to signal a left-hand turn. When the stalk switch is moved up, lights located generally in the front and rear right side fenders begin to blink. Similarly, when the stalk switch is moved down, lights located generally in the front and rear left side fenders begin to blink. More typically, the stalk switch includes four positions, two up and two down. The first positions, either up or down, operate the turn signals but the stalk switch returns to the off position, or center, when released. The second of the positions maintains the turn signals on even when the stalk switch is released and shuts off after the steering wheel has been turned a fixed rotation and then returned to an approximately "wheels straight" position.

With the mechanism described above, several well-known problems arise. For example, turn signals may be left on with the signal lights "blinking" well after a turn is completed. A common condition is that signal lights turn off prematurely if the steering wheel is momentarily turned even slightly away from the direction of the turn. Another common condition is the failure of a turn signal to engage if the steering wheel is slightly turned in one direction and the driver attempts to signal a turn in the opposite direction. Such problems have existed since the turn signal was first installed on a motor vehicle.

Recent advances have addressed different physical configurations and different control mechanisms for improving on the operation of the turn signal. For example, more sophisticated in-vehicle computer hardware, such as those systems offered by RLP Engineering, Dayton, Ohio, has allowed for the real-time management of turn signal operation to address problems such as those described above. In such a system, vehicle speed, steering wheel position and other data are monitored in real time to determine whether the vehicle is turning and when the turn has been completed. However, even in such a computer-based system, the turn signal is activated by moving a stalk switch up or down to turn on the switch and the corresponding turn signal light. The turn signal of this computer-based system can be manually switched off by a button on the stalk switch. One disadvantage of this system is that one hand must be removed from the steering wheel in order to operate the stalk switch.

Other modifications of the turn signal have focused on replacing the stalk switch with buttons or paddles located in the hub of the steering wheel, such as the apparatuses illustrated in U.S. Pat. No. 5,739,491 to Crosson, Jr. and U.S. Patent Application Publication 2009/01655592 to Sakai et al. However, such modifications do not address the disadvantages described above. Specifically, placing the turn signal activation switches in the hub of the steering wheel still requires the driver either to remove one hand from the steering wheel or to release his grasp on the wheel in order to operate the hub-mounted switch. Such modifications also do not address problems arising when the turn signal is left on after a turn or when the turn signal prematurely turns off.

Spoke-mounted turn signal activation switches, such as those envisioned in U.S. Pat. No. 5,823,666 to Kingsolver, do not eliminate the requirement that a driver's hand must be repositioned to activate the switch even if the hand remains in contact with the steering wheel. The natural position of the driver's thumb is aligned with the rim of the steering wheel or wrapped partially around the rim of the steering wheel when the wheel is gripped. Therefore, a driver must release his/her grip from the steering wheel in order to re-position the thumb on the spoke mounted switch. This change in position is necessary regardless of the location of the spoke around the internal diameter of the steering wheel. If the driver's hand is located proximal to or in contact with the spoke and above the spoke, the driver must rotate the hand downward to contact the spoke-mounted switch. If the driver's hand is located proximal to or in contact with the spoke and below the spoke, the driver must either rotate the hand downward to contact the spoke-mounted switch or move the hand upward and rotate the thumb downward to make contact with the switch. Such a rotation or movement requires that the driver release his/her grip from the wheel in order to move the hand.

Even though the expressed advantage of placing the turn signal switch in the spoke of the steering wheel was that it would permit turn signal operation without the driver needing to remove his/her hands from the steering wheel, in practice a driver must re-position his/her hands to press the spoke-mounted switches. As addressed above, such a design, like those placing the turn signal activation switch in the steering wheel hub, permits the operation of the switch without removing one hand from the steering wheel in very limited and still undesirable positions of the hand relative to the steering wheel.

In U.S. Pat. No. 6,961,644 to Mercier et al., a steering wheel with hot buttons placed at the "10 o'clock" and "2 o'clock" positions on the steering wheel rim was posited. According to this publication, such a system would allow a driver to activate the hot buttons, thus activating a turn signal, by using a thumb. Such a process of activating a turn signal, according to this publication, would not require a driver "to even move his or her hands much." However, tests conducted demonstrated that the hot buttons of this hypothetical device cannot be pressed if the driver maintains a fully-wrapped four finger grip anywhere on the top half of the steering wheel. Therefore, this hypothetical device suffers from all of the problems of other earlier devices because it merely relocates the functionality of the turn signal stalk switch to hot buttons on the rim of the steering wheel. Turn signals may be inadvertently turned on by misplacement of the hand or remain on with the signal lights "blinking" well after a turn is completed. Turn signal lights may turn off prematurely if the steering wheel is momentarily turned even slightly away from the direction of the turn. Furthermore, with this hypothetical device the driver must loosen his or her grip on the steering wheel so that the hand may be rotated in order to put the thumb in position to operate the hot buttons.

According to "Hands-On: A Practical Measure of the Perceived Risk of the Driving Context," J. A. Thomas and D. Walton, Transit NZIHT 7$^{th}$ Annual Conference (2005), most drivers place both hands somewhere on the top half of the steering wheel when driving under higher-risk or complex conditions. It follows then that most drivers feel that driving with two hands on the top half of the steering wheel, particularly during high-risk or complex driving situations, provides more control over the vehicle.

A driver in many instances must remove one hand from the steering wheel in order to operate a stalk switch-activated turn signal because the stalk switch is typically not located in close enough proximity to the steering wheel. Regardless of the driver's hand position, one hand must always be removed from the steering wheel in order to operate a stalk switch-activated turn signal. Where the turn signal switches are located in the hub of the wheel, the result is essentially the same. Either the driver's hand must be removed from the steering wheel to activate the hub-mounted switch or the hand must be turned so that the thumb of the driver's hand can reach the hub-mounted switch. In turning the hand to stretch the thumb to reach the switch, a driver must release his/her grip on the steering wheel, even if the hand remains in contact with the steering wheel. Similarly, when the turn signal switch is located in a spoke of the steering wheel, the driver must reposition his or her hand in order to operate the spoke-mounted switch.

It would therefore be advantageous to have a turn signal activation switch and system which does not require that a driver release his/her grip from the steering wheel in order to operate the switch. It would be a further advantage to have a turn signal activation switch and system which can be operated during high-risk or complex driving situations while maintaining a two-handed grip on the steering wheel. It would be an additional advantage to have a turn signal activation switch and system that would not prematurely turn off or remain on after a turn. It would be yet a further advantage to have a turn signal activation switch and system that could not be accidently operated.

SUMMARY OF THE INVENTION

The present invention provides a turn signal activation switch and system which is integral to the rim of a steering wheel and may be operated without the need for a driver to change his/her grip on the steering wheel. The present invention more specifically provides a turn signal activation system which permits activating a turn signal while maintaining a two-handed four-fingered grip on the steering wheel during high-risk or complex driving situations. In a preferred embodiment, the present invention provides an integrated turn signal activation system for use with a motor vehicle steering wheel having an annular ring. The integrated turn signal activation system includes a left actuator, the left actuator attached to the steering wheel annular ring between the 9 o'clock and 12 o'clock positions on the annular ring; a right actuator, the right actuator attached to the steering wheel annular ring between the 3 o'clock and 12 o'clock positions on the annular ring; and a controller, the controller connected to the left and right actuators, the controller further connected to a left side exterior light and a right side exterior light, the left side and right side exterior lights being mounted on the motor vehicle exterior. The left actuator and the right actuator of this embodiment do not overlap. Furthermore, the controller activates the left actuator and the right actuator when the left and the right actuators are depressed simultaneously and held for a pre-set threshold time, thus providing an activated left actuator and an activated right actuator. The pre-set threshold time may range from about 0.5 seconds to about 5 seconds, but is preferably about 1 second. In accordance with the present invention, the left exterior light is energized when the activated left actuator is depressed and the right exterior light is energized when the activated right actuator is depressed.

In still further embodiments of the present invention, each of the left and right actuators may include an array of switches such that the array of switches may be depressed in multiple locations using multiple positions of the hand. In one embodiment, the controller determines when a thumb-sized pattern of switches in a switch array is depressed. If a thumb-sized pattern of switches has been depressed, then the controller will recognize the corresponding actuator as being in the "on" position. In still further embodiments, an audible signal may be emitted and/or a dash light turned on when an activated actuator is depressed to energize the corresponding exterior turn signal light.

BRIEF DESCRIPTION OF THE DRAWINGS

FIG. 10 is a diagram of an embodiment of the system of the present invention showing a steering wheel, controller, stalk switch and turn signal circuits.

DETAILED DESCRIPTION OF THE INVENTION

Figure 1A:
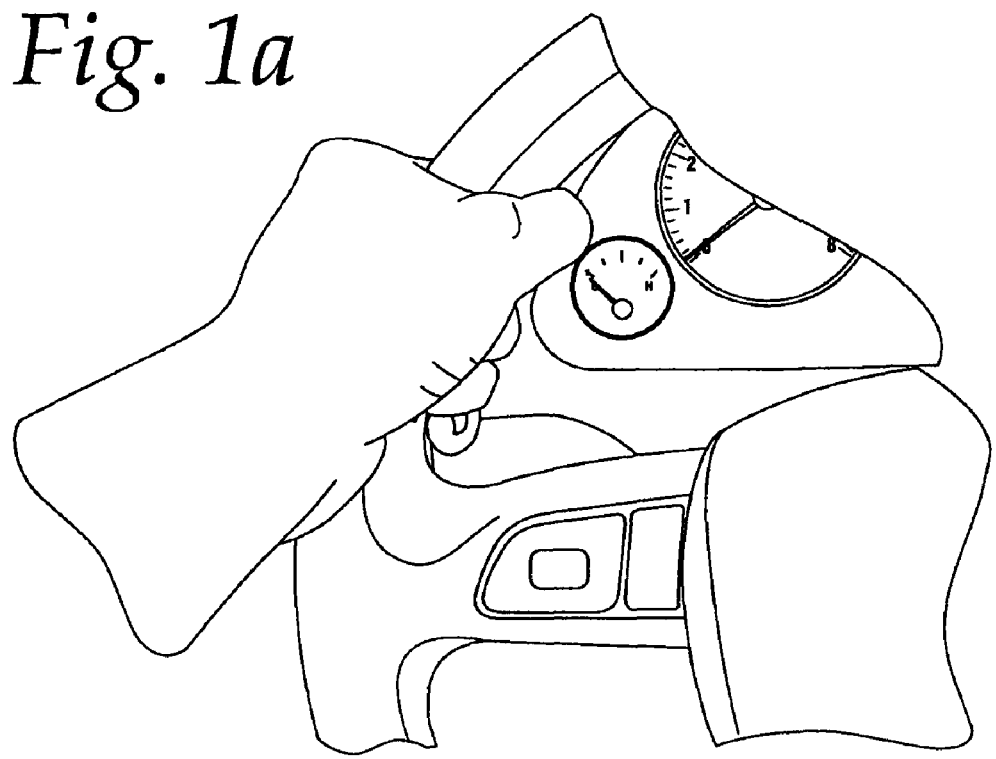
FIG. 1a is an illustration of a driver's hand gripping a steering wheel in a four-fingered grip.
Figure 1B:
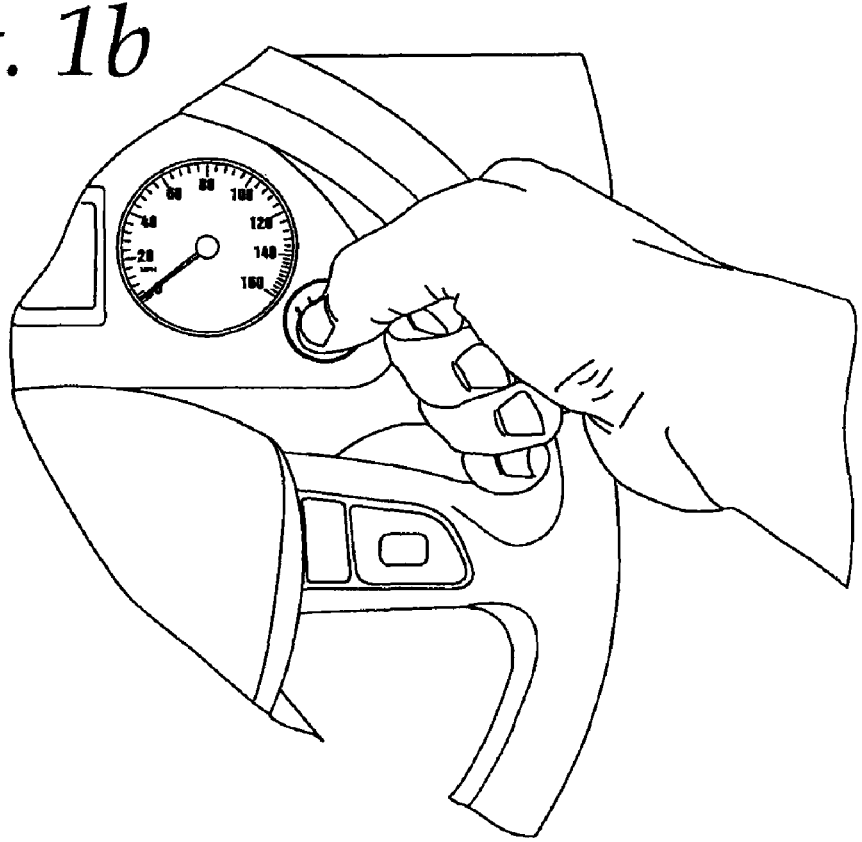
FIG. 1b is a further illustration of a driver's hand gripping a steering wheel in a four-fingered grip.

It is generally desirable, if not advisable, for a driver to grip a steering wheel of a motor vehicle in a four-fingered grip with the fingers of the hand wrapped around the rim of the steering wheel when driving the motor vehicle. The four-fingered grip is illustrated in FIGS. 1a and 1b. Such a four-fingered grip securely positions the steering wheel in a driver's hands. Embodiments of the present invention are directed towards allowing a driver to maintain a four-fingered grip on the steering wheel while operating the vehicle's turn signals.

Figure 2:
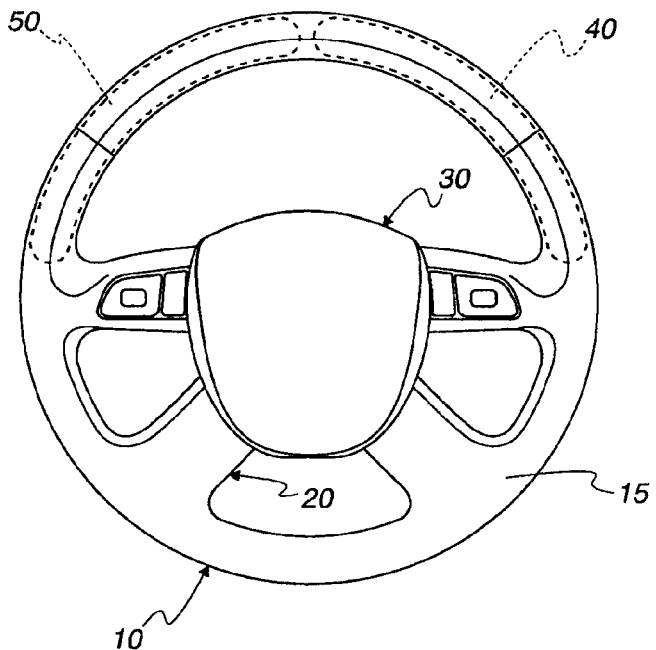
FIG. 2 is an illustration of a steering wheel of an embodiment of the present invention.

In one embodiment, the present invention provides a system which permits the controlled operation of a motor vehicle's turn signals without a driver being required to let loose of the steering wheel. The system of this embodiment, referring now to FIG. 2, would include switches, sensors or gages, collectively actuators, integrally mounted to a steering wheel 10. As shown in FIG. 2, actuators 40, 50 may be proximal to each other, but actuators 40, 50 do not overlap. The steering wheel 10 of the present embodiment includes an annular ring 15 which may be connected to a hub 30 by one or more spokes 20. Other configurations of a steering wheel will be known to those of ordinary skill in the art.

Figure 3:
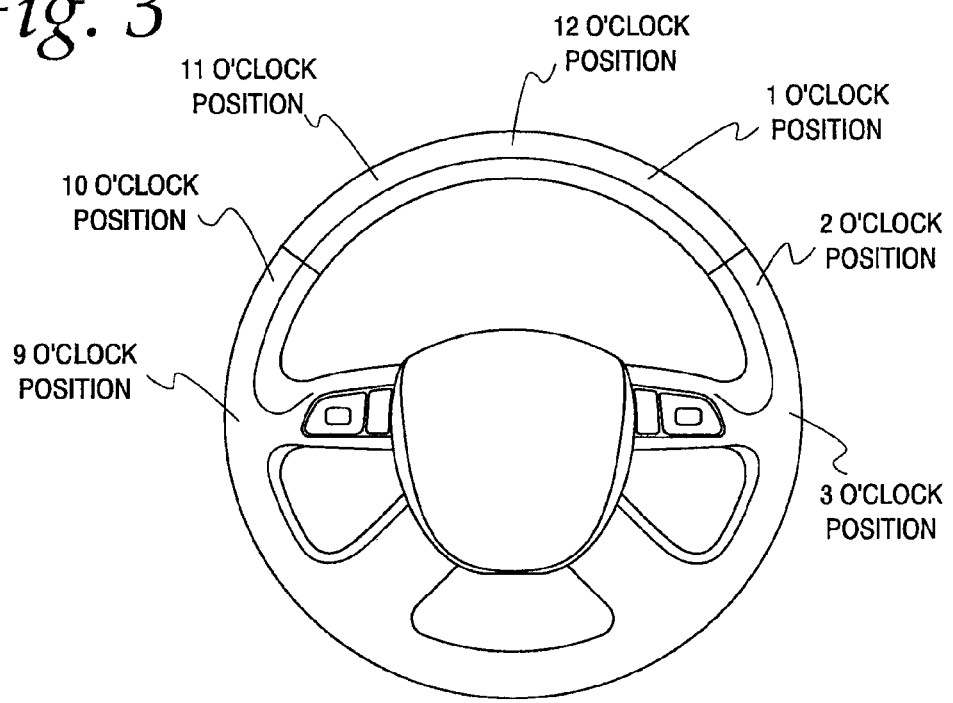
FIG. 3 is an illustration of the clock positions designating locations on a steering wheel.

Referring now to FIG. 3, the upper half of annular ring 15 of steering wheel 10 may be designated by the clock positions from 3 o'clock on the right-hand side of steering wheel 10 through 9 o'clock on the left-hand side of steering wheel 10. As also shown in FIG. 2, actuator 40 may be positioned to cover a portion of steering wheel 10 between the 3 o'clock position and the 12 o'clock position. Similarly, actuator 50 may be positioned to cover a portion of steering wheel 10 between the 9 o'clock position and the 12 o'clock position. When actuators 40, 50 are so positioned they may abut, but do not overlap. Accordingly, in one embodiment the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions. A standard-sized steering wheel has a diameter of approximately 15 inches. Therefore the circumferential segment of annular ring 15, or the "arc-segment-length," from the 3 o'clock position to the 12 o'clock position has a length of about 12 inches. Similarly, the arc-segment-length from the 9 o'clock position to the 12 o'clock position also has a length of about 12 inches.

Figure 4:
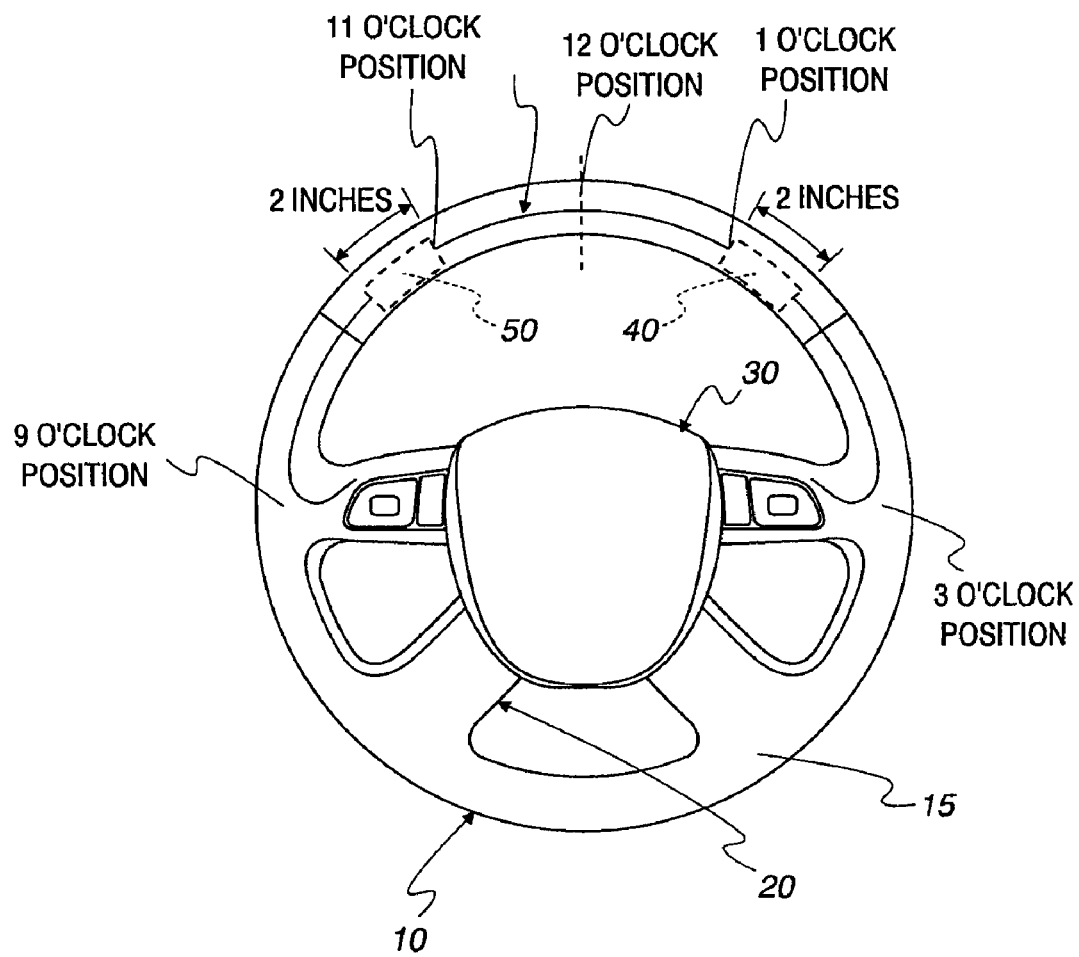
FIG. 4 is an illustration of a steering wheel of an embodiment of the present invention showing a preferred actuator location.

Actuators 40, 50 may be sized to cover the entire arc-segment-length between the 3 o'clock and 12 o'clock positions and the 9 o'clock and 12 o'clock positions, respectively, as described above. Alternatively, actuators 40, 50 may be sized to cover only a portion of the arc-segment-length between the 3 o'clock and 12 o'clock positions and the 9 o'clock and 12 o'clock positions, respectively. As shown in FIG. 4, one preferred size and location for actuators 40, 50 is an arc-segment-length of 2 inches with actuators 40, 50 covering a portion of annular ring 15 of steering wheel 10 ending at about the 1 o'clock and 11 o'clock positions respectively such that actuator 50 extends counterclockwise towards the 9 o'clock position and actuator 40 extends clockwise towards the 3 o'clock position.

Figure 5:
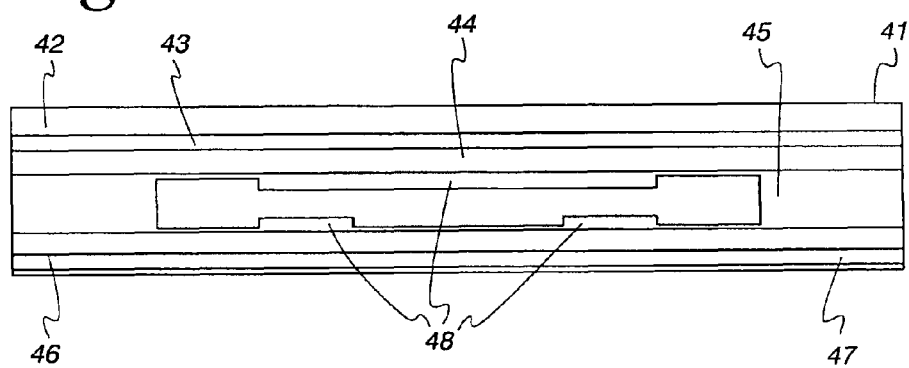
FIG. 5 is an illustration of one preferred actuator design of the present invention.

Actuators 40, 50 of the present invention may be membrane switches of a type manufactured by Tapecon, Inc., Tapecon Membrane Switch Division, Rochester, N.Y. Membrane switches, as is known in the art, may be manufactured in variety of configurations each of which are single pole, single throw switches which are normally open. Membrane switch configurations include a standard membrane switch construction, a tactile plastic dome construction and a stainless steel dome construction. FIG. 5 illustrates one type of membrane switch 41 which includes top overlay 42, adhesive layer 43, top circuit 44, circuit spacer 45, bottom circuit 46, bottom overlay 47 and contacts 48. Membrane switch 41 is normally open. When top overlay 42 is depressed, top circuit 44 is flexed so that a circuit is completed at contacts 48. Depending on the arc-segment-length, as described above, actuators 40, 50 may each include one or more membrane switches. Membrane switch arrays, which cover a larger area than a single membrane switch, are taught, for example, in WO1995001302, titled "Curve-conforming Sensor Array Pad." Actuators 40, 50 may be a fiber optic pressure sensor, or an array of fiber optic pressure sensors, of the type manufactured by Luna Innovations, Blacksburg, Va. Alternatively, actuators 40, 50 may be a large-area flexible pressure sensor matrix of the type developed by the Quantum-Phase Electronics Center, School of Engineering, University of Tokyo, Tokyo, Japan and described in "A Large-Area, Flexible Pressure Sensor Matrix With Organic Field-Effect Transistors For Artificial Skin Applications," T. Someya et al., PNAS, vol. 101, no. 27, Jul. 6, 2004. Furthermore, actuators 40, 50 may be a flexible strain gage of a type available from Omega Engineering, Inc., Stamford, Conn.

The actuators 40, 50 may be mechanically bonded to the steering wheel, such as by thermal or sonic welding if the materials of construction of the actuators 40, 50 and the steering wheel 10 are compatible and susceptible to such attachment. The actuators 40, 50 may be attached to the steering wheel 10 using an adhesive. The actuators 40, 50 when attached to the steering wheel 10 may be covered by a cover or skin (not shown) so that the actuators 40, 50 reside under the skin of the steering wheel 10. Actuators 40, 50 can be positioned under the skin of the steering wheel 10 so as to make the actuators 40, 50 undetectable by the human eye. The actuators 40, 50 may be molded into the steering wheel 10 during the process of manufacturing the steering wheel 10. When molded into the steering wheel 10, the actuators may be positioned under the surface of the steering wheel 10 if the material of construction of the steering wheel 10 is sufficiently deformable to permit deforming the steering wheel 10 in a manner that also allows activating the actuators 40, 50.

The properties of the material of construction of a steering wheel 10 will be known to those of ordinary skill in the art such that the permissible methods for attachment of actuators 40, 50 to the steering wheel 10 will be also be understood. For example, it is known in the art that steering wheels may be molded from a pliable cross-linked vinyl chloride polymer as taught in U.S. Pat. No. 4,567,217 to Yamazaki et al. It is further understood in the art that flexible sensors, such as membrane switches, may be encapsulated in a molded part as taught in U.S. Pat. No. 5,762,853 to Harris et al. Also, insert molded membrane switches have been used as steering wheel hub-mounted horn switches as taught in U.S. Pat. No. 5,198,629 to Hayashi et al.

Figure 6:
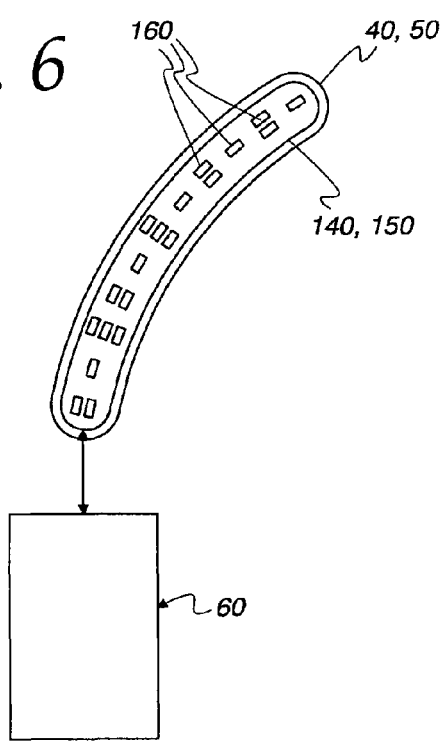
FIG. 6 is an illustration of an embodiment of the present invention in which an actuator includes a plurality of switches in a switch array.

To accommodate different hand positions used by a driver during operation of a vehicle, actuators 40, 50 may be configured to sense when the thumb of a hand is pressing one or both of the actuators 40, 50. FIG. 6 illustrates one design in which each of actuators 40, 50 are made up of switch arrays 140, 150, respectively, and where the switch arrays 140, 150 each include a plurality of switches 160. The switch array 140, 150 of FIG. 6 is merely illustrative and does not depict a necessary configuration of switches 160. The switches 160 are normally open (off), closed when depressed or selected (on), and return to open (off) when deselected. Each of switches 160 is connected to a controller 60 so that controller 60 may sense when a switch 160 is in the open position or the closed position. Switches 160 may be connected to controller 60 via a wiring harness (not shown) for example, such that each switch 160 is wired to a terminal block (not shown) and the terminal block is wired to the controller 60 via the wiring harness. Those of ordinary skill in the art will recognize other connection means for wiring switches 160 to controller 60. The activation state of each switch 160 in switch arrays 140, 150, that is to say whether a switch 160 is on or off, may be determined by the controller 60. In a typical operation, a switch 160 opens and closes an electrical circuit between the switch 160 and the controller 60. If only switches 160 corresponding to a thumb-sized pattern are depressed, then the actuators 40, 50 will be recognized as being in the "on" position by the controller 60. However, if switches 160 corresponding to a pattern larger than a thumb are depressed, then actuators 40, 50 will be recognized as being in the "off" position.

In the embodiment of the present invention that incorporates actuators 40, 50 as illustrated in FIG. 6, the controller 60 is programmed to determine when switches 160 are depressed in a thumb-sized pattern. As used herein, a thumb-sized pattern means an area that ranges from about 0.5 square inches to about 2.25 square inches. Thus, if a full four-fingered grip is taken of steering wheel 10 a pattern of switches 160 may be depressed, depending on where the driver places his or her hand on the steering wheel, which exceeds the size of the pattern of switches made when a thumb depresses one of actuators 40, 50. Under this condition, controller 60 does not activate actuators 40, 50 and controller 60 recognizes actuators 40, 50 as being in the "off" position. However, if a thumb is then placed on either actuator 40 or actuator 50, controller 60 registers that a thumb-sized pattern of switches has been depressed and controller 60 recognizes either actuator 40 or actuator 50, respectively, as being in the "on" position. Once actuators 40, 50 are activated via controller 60, either actuator 40 or actuator 50 may be depressed to turn on the corresponding signal lights (not shown). Once activated, simultaneously pressing actuator 40 and actuator 50 will not turn on the corresponding turn signal lights. If controller 60 has not activated actuators 40, 50, then depressing either actuator 40 or actuator 50 will not turn on the corresponding turn signal lights.

In one embodiment, pressing an activated actuator 40 or an activated actuator 50 will turn on an audible signal in addition to turning on the corresponding turn signal lights. The audible signal may serve to indicate to the driver that the turn signal has been turned on. The audible signal may also serve to indicate that the actuators 40, 50 have become activated. In one embodiment, the audible signal may emanate from the speaker system of the motor vehicle that is used, for example, to signal that a car door is open when the ignition key remains in the ignition switch. In another embodiment, the audible signal may emanate from the same sound source used to alert a driver of the motor vehicle that the stalk-switch-operated turn signal has been turned on. In another embodiment, the audible signal may be wirelessly broadcast using BLUETOOTH® technology such that the audible signal is received in an ear piece or headset worn by the driver and the driver thereby hears the audible signal. In yet another embodiment, actuators 40, 50 may be connected to corresponding turn signal indicator lights located in the dashboard of the motor vehicle such that pressing an activated actuator 40 or an activated actuator 50 will light the corresponding turn signal indicator lights.

Figure 7:
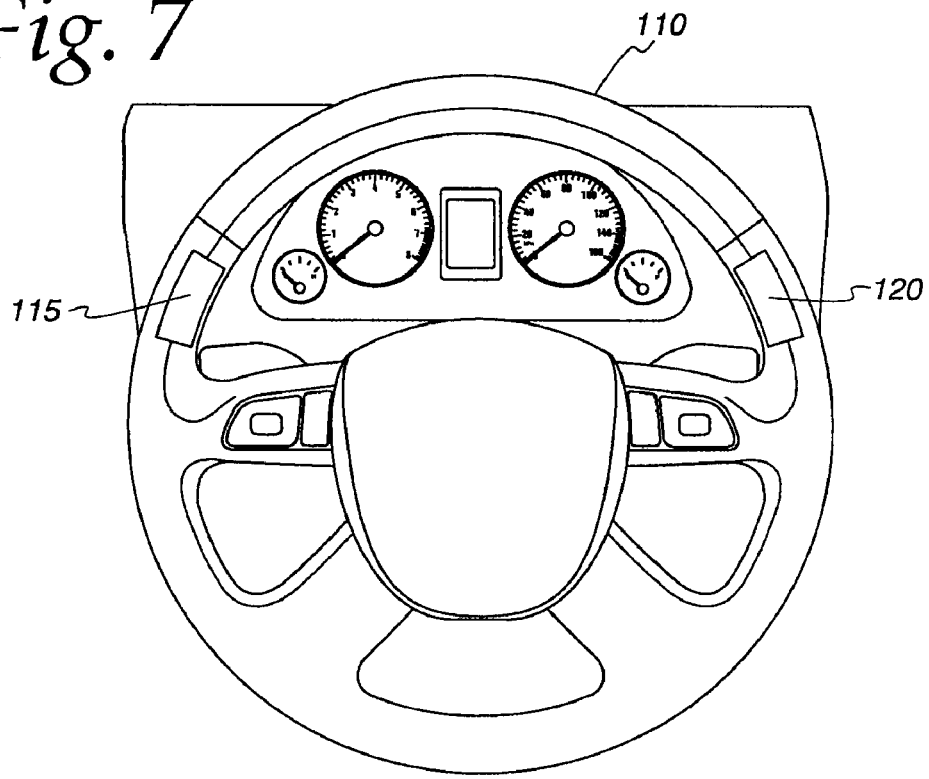
FIG. 7 is an illustration of a steering wheel of the prior art illustrating the position of the steering wheel-mounted turn signal switches.
Figure 8A:
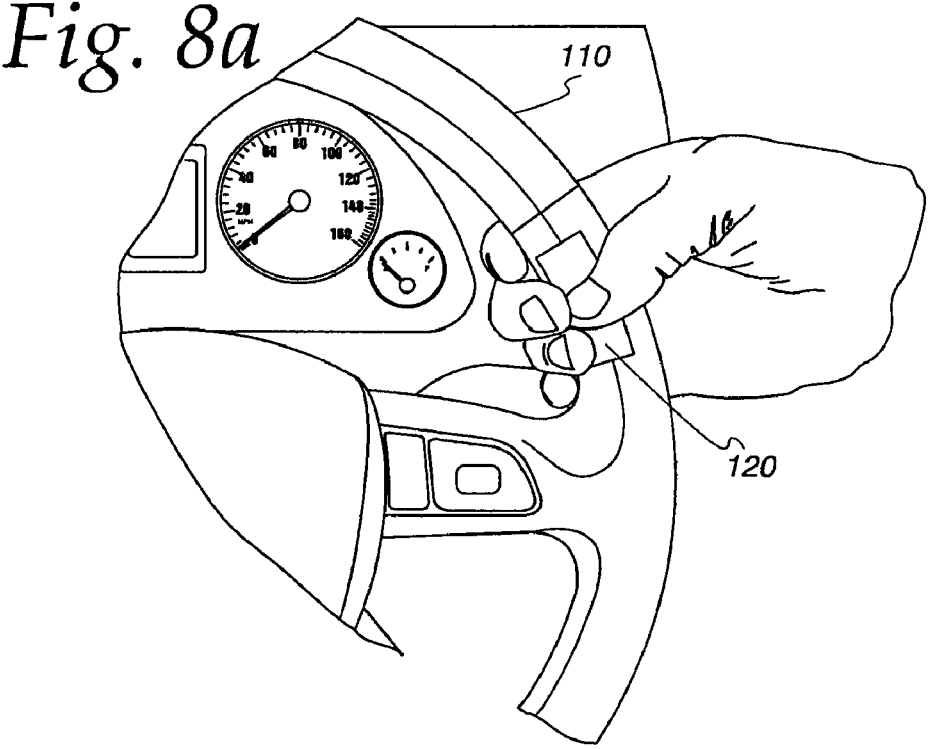
FIG. 8a is an illustration of a driver gripping the prior art steering wheel of FIG. 7 illustrating the position of the driver's hand relative to steering wheel-mounted turn signal switches.
Figure 8B:
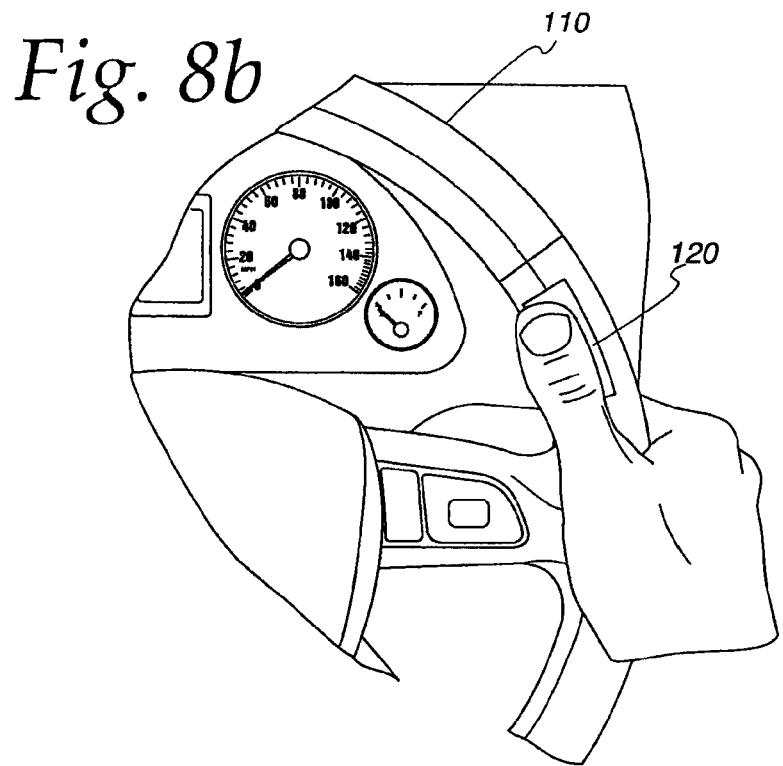
FIG. 8b is a further illustration of a driver gripping the prior art steering wheel of FIG. 7 illustrating the position of the driver's hand relative to steering wheel-mounted turn signal switches.
Figure 8C:
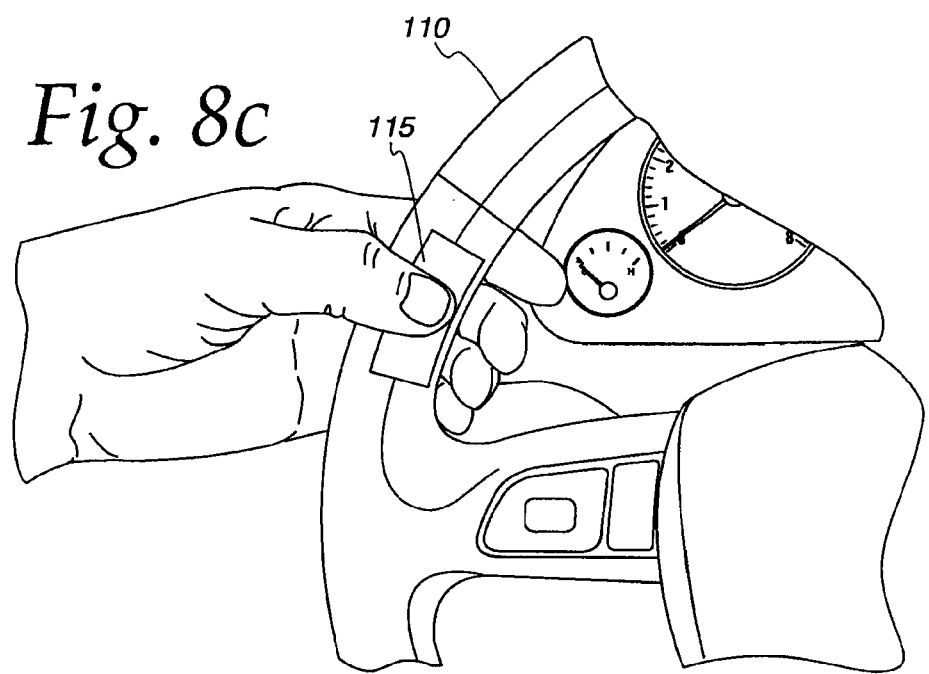
FIG. 8c is yet a further illustration of a driver gripping the prior art steering wheel of FIG. 7 illustrating the position of the driver's hand relative to steering wheel-mounted turn signal switches.
Figure 8D:
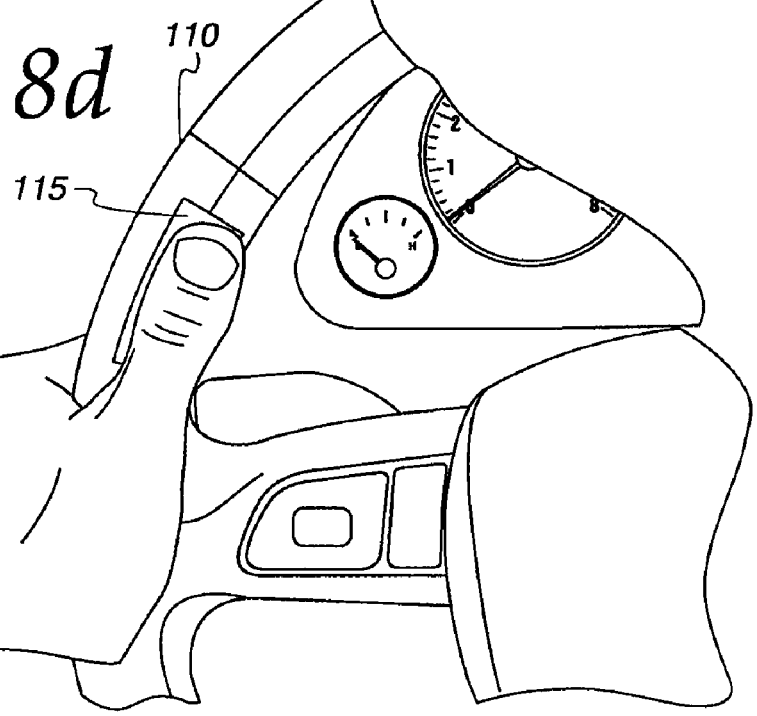
FIG. 8d is still a further illustration of a driver gripping the prior art steering wheel of FIG. 7 illustrating the position of the driver's hand relative to steering wheel-mounted turn signal switches.

FIG. 7 illustrates a steering wheel 110 of the prior art and FIGS. 8a-8d illustrate a driver's hands gripping the steering wheel 110 of FIG. 7. In FIG. 7, hot buttons 115, 120 are depicted positioned on the steering wheel 110 as described in the prior art. As used herein, the term "hot button" refers to a single on/off switch which is pressed to turn on and pressed again to turn off. Thus, hot buttons 115, 120 are placed at the 10 o'clock and 2 o'clock positions on the steering wheel 110, respectively. Referring to FIG. 8a, it is clear that the four-fingered grip of the driver must be loosened, thus not fully gripping steering 110, in order to rotate the thumb into position to depress hot button 115. In FIG. 8b, the driver must again modify the four-fingered grip to accommodate the spoke 125 in order to access and depress hot button 115. In FIG. 8c, it is again clear that the four-fingered grip of the driver must be loosened, thus not fully gripping steering 110, in order to rotate the thumb into position to depress hot button 120. As was seen in FIG. 8b, FIG. 8d illustrates how the driver must modify the four-fingered grip to accommodate the spoke 125 in order to access and depress hot button 120.

Figure 9A:
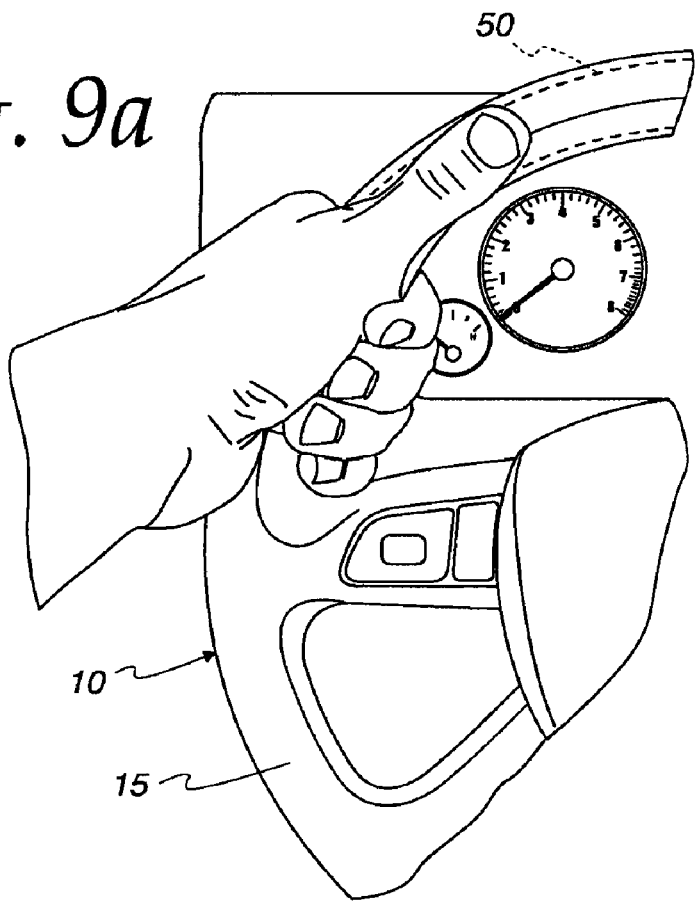
FIG. 9a illustrates a driver gripping the steering wheel of the present invention while maintaining a four-fingered grip and activating the turn signal actuator.
Figure 9B:
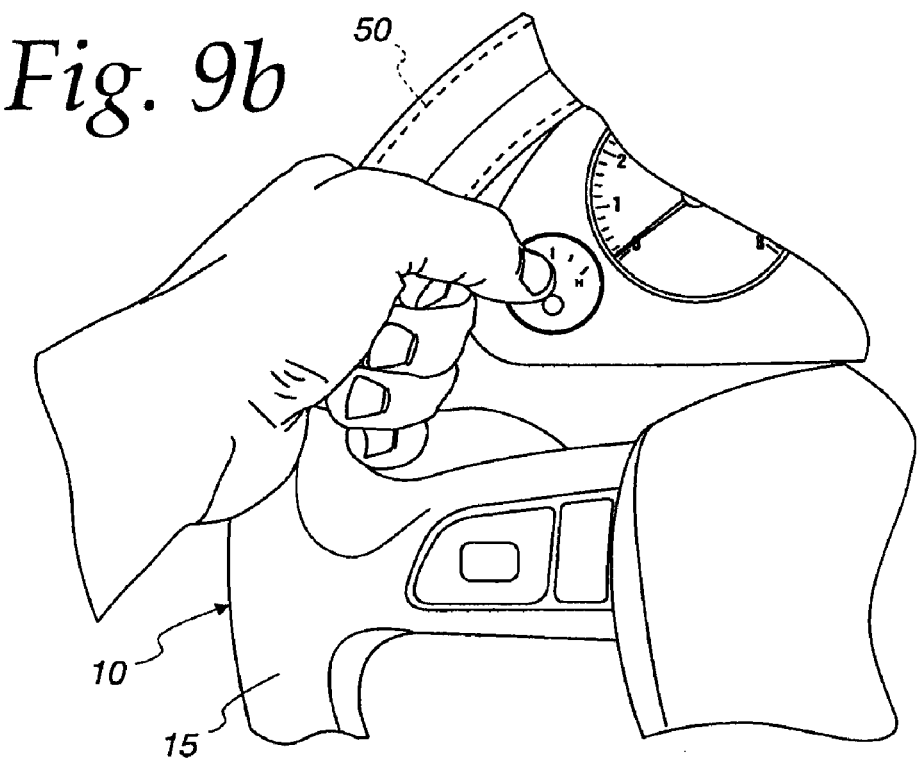
FIG. 9b illustrates a driver gripping a steering wheel of the present invention in a four-fingered grip.
Figure 9C:
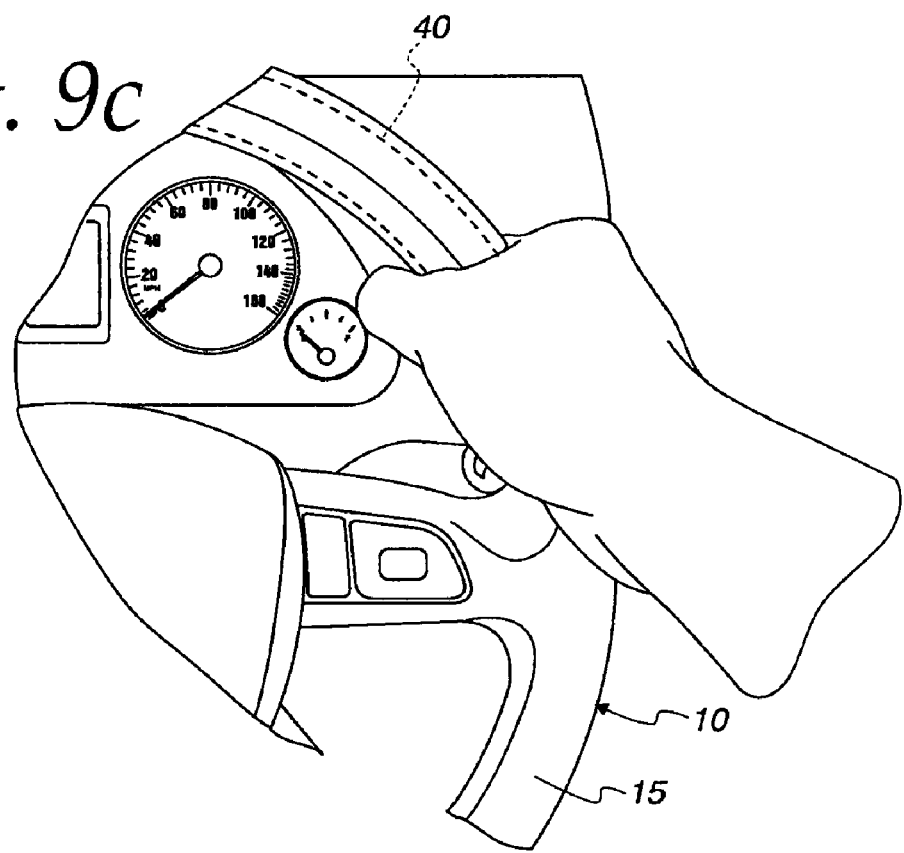
FIG. 9c illustrates another view of a driver gripping the steering wheel of the present invention in a four-fingered grip.
Figure 9D:
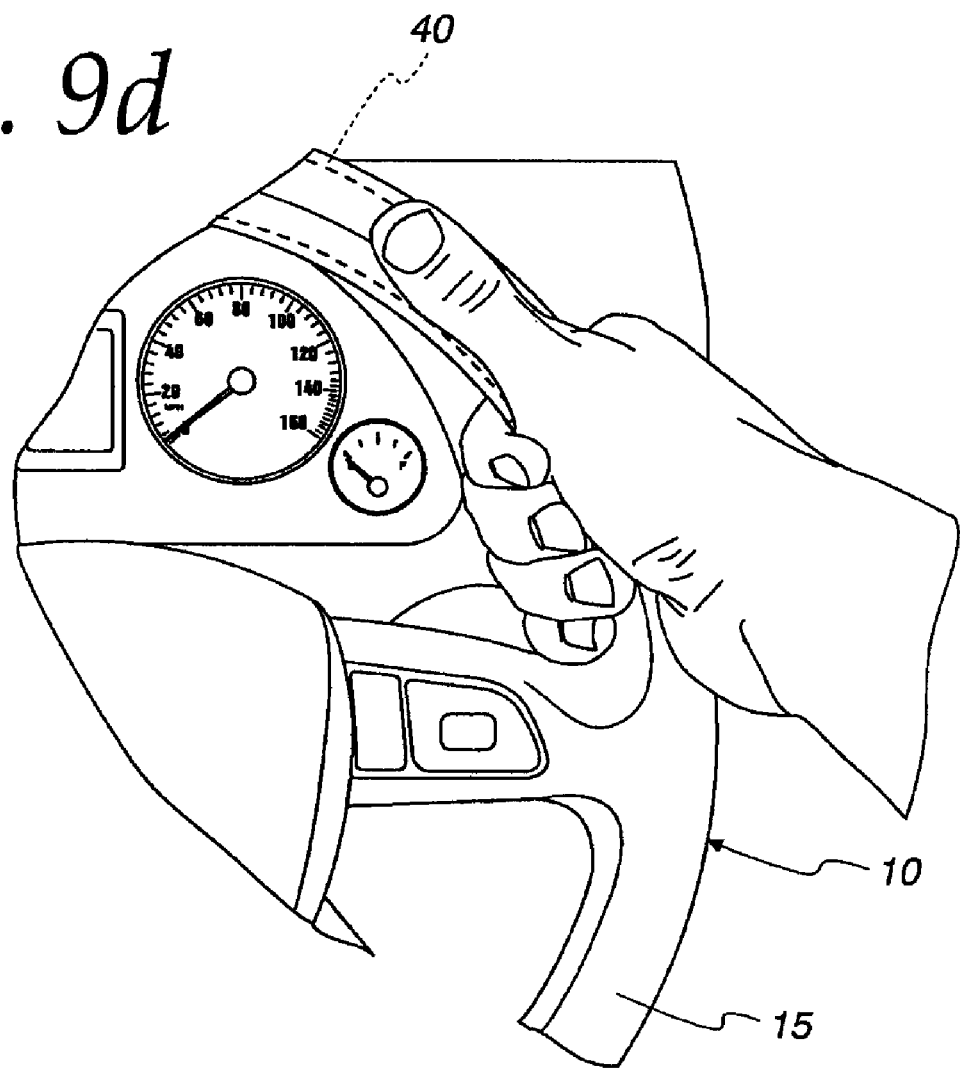
FIG. 9d illustrates a driver gripping the steering wheel of the present invention while maintaining a four-fingered grip and activating the turn signal actuator.

In one embodiment, actuators 40, 50 are preferably positioned on annular ring 15 of steering wheel 10 facing the driver. When positioned in this location, actuators 40, 50 may be activated when the driver presses down on the steering wheel using a thumb of the driver's left or right hands. FIGS. 9a-9d illustrate a driver gripping annular ring 15 of steering wheel 10 with the driver's thumb position in a full four-fingered grip ((FIGS. 9b and 9c) and with the thumb positioned over actuators 40, 50 (FIGS. 9a and 9d). It will be recognized by persons of ordinary skill in the art that actuators 40, 50 may be positioned in locations other than on the side of annular ring 15 directly facing the driver.

Referring now to FIG. 10 which illustrates an embodiment of the present invention, actuators 40, 50 are connected to controller 60. Controller 60 includes processor 70. Processor 70 includes logic circuits 80, timer 90 and memory 100. Controller 60 is connected to right-side signal circuit 145 and left-side signal circuit 150. Right-side signal circuit 145 includes right-side signal lights (not shown) and left-side signal circuit (155) includes left-side signal lights (not shown). Turn signal stalk switch (not shown) may also be connected to controller 60.

In an embodiment of the present invention, controller 60 controls the operation of actuators 40, 50 such that when actuator 40 is depressed, right side signal lights (not shown) of right-side signal circuit 145 are energized and when actuator 50 is depressed, left-side signal lights (not shown) of left-side signal circuit 150 are energized. When energized, right-side signal lights and/or left-side signal lights (not shown) may "blink" as is common to all turn signals.

Figure 11:
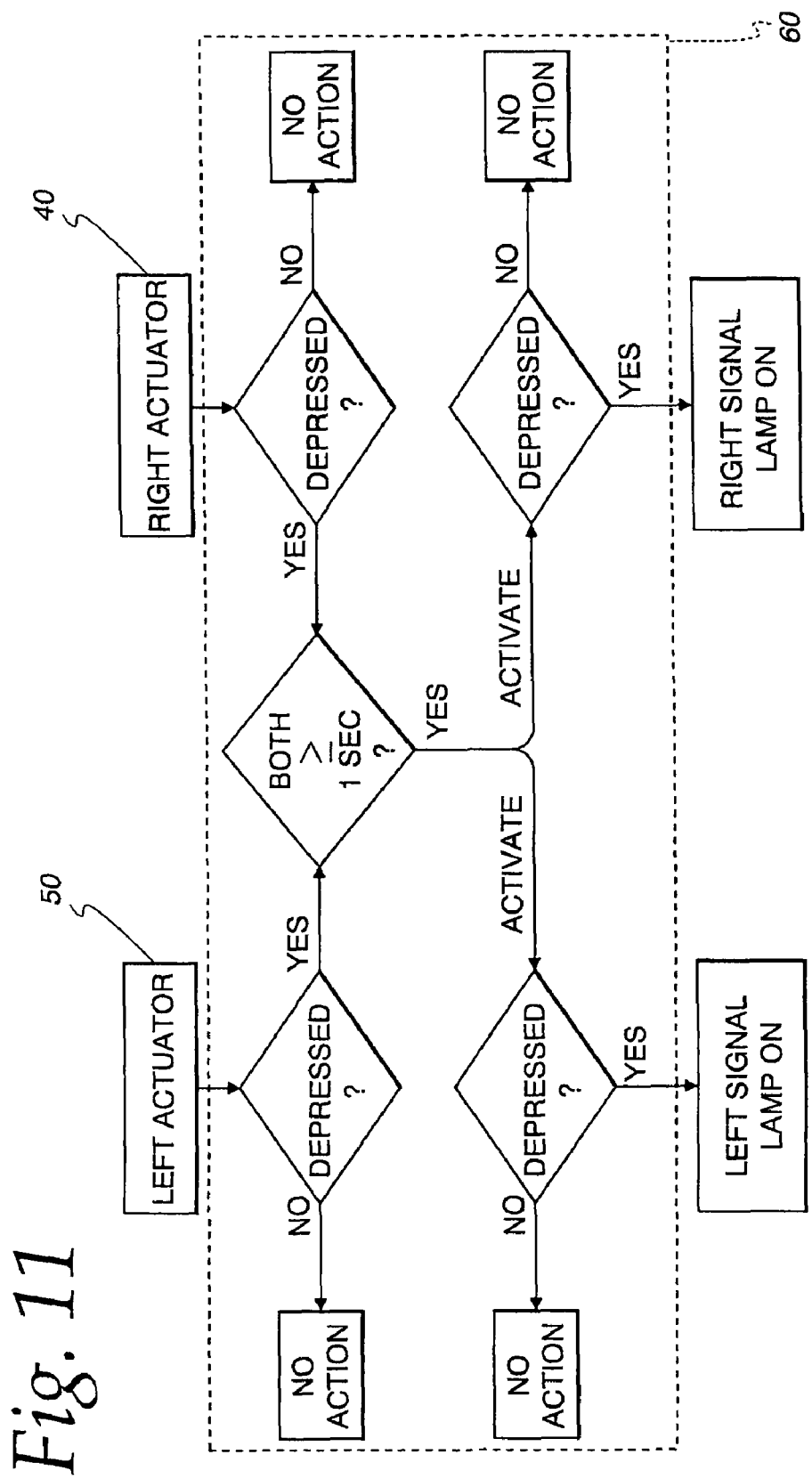
FIG. 11 is a logic diagram illustrating the operation of an embodiment of the present invention.

FIG. 11 illustrates the circuit logic of one embodiment of the present invention. In this embodiment, when actuator 40 is depressed it is in a closed position and it completes a circuit to controller 60. Similarly, when actuator 50 is depressed it completes a circuit to controller 60. If both actuator 40 and actuator 50 are depressed, controller 60 via timer 90 (shown in FIG. 10) measures the time each of actuator 40 and actuator 50 is depressed. If the measured time exceeds a pre-set threshold time, 1 second for example, then controller 60 activates actuators 40, 50. If the measured time is less than the pre-set threshold time, controller 60 does not activate actuators 40, 50. The pre-set threshold time can be varied and programmed into memory 100 shown in FIG. 10 such that logic circuits 80 of FIG. 10 in controller 60 activate actuators 40, 50. The pre-set threshold time may range from about 0.5 seconds to about 5 seconds. It is preferred that the pre-set threshold time be about 1 second. When activated, depressing actuator 40 results in the right side signal lights (not shown) of right-side signal circuit 145 to be energized and when actuator 50 is depressed left-side signal lights (not shown) of left-side signal circuit 150 are energized. When energized, right-side signal lamp and/or left-side signal lamp (not shown) may "blink" as is common to all turn signals.

Figure 12A:
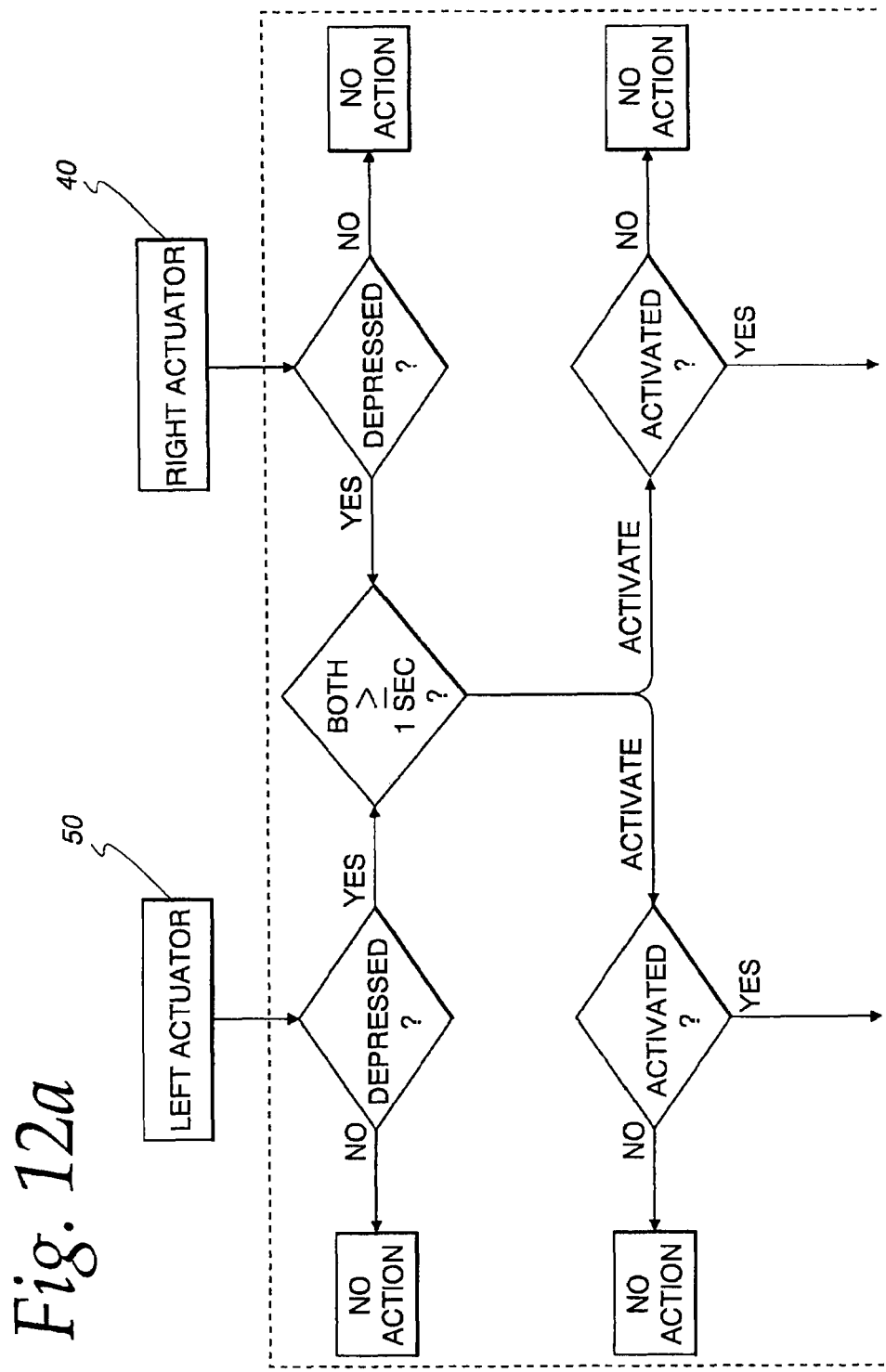
FIGS. 12a and 12b are a logic diagram illustrating the operation of an embodiment of the present invention in which a controller is used to determine when a thumb is pressing on a steering wheel to activate a turn signal.
Figure 12B:
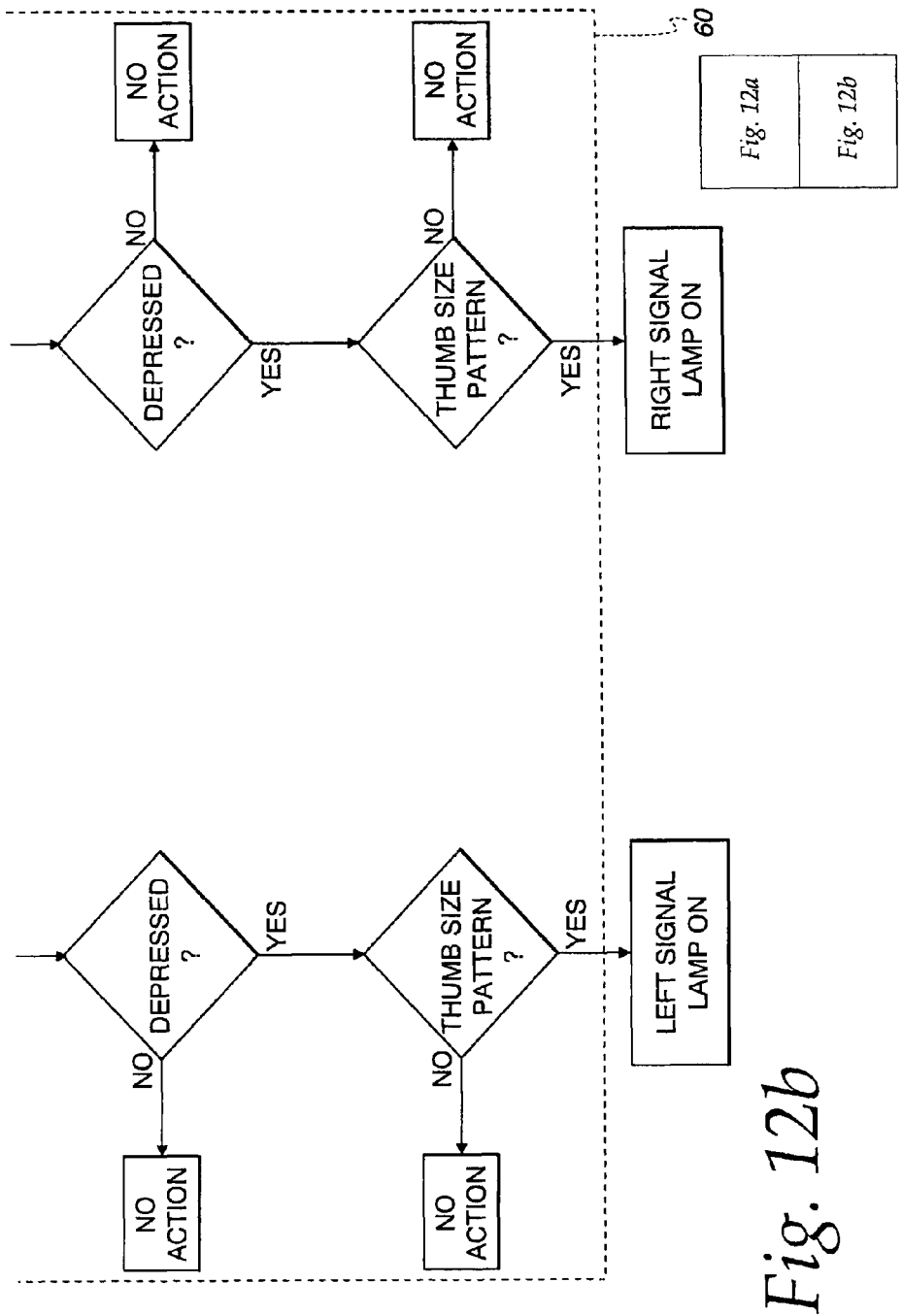

FIG. 12 illustrates the logic circuit of a further embodiment of the present invention in which actuators 40, 50 are of the type illustrated in FIG. 6. In this embodiment, actuator 40 and actuator 50 are each made up of switch arrays 140, 150, respectively, where each switch array 140, 150 includes a plurality of switches 160. The switches 160 are normally open (off), closed when depressed or selected (on), and return to open (off) when deselected. Each of switches 160 is connected to a controller 60 so that controller 60 may sense when a switch 160 is in the open position or the closed position. In a typical operation, a switch 160 opens and closes an electrical circuit between the switch 160 and the controller 60. If only switches 160 corresponding to a thumb pattern are depressed, then the actuators 40, 50 will be recognized as being "on" by the controller 60. However, if switches 160 corresponding to a pattern larger than a thumb-sized pattern are depressed, then actuators 40, 50 will be recognized as being "off." The controller 60 is programmed to determine when switches 160 are depressed in a thumb-sized pattern. Thus, if a full four-fingered grip is taken of steering wheel 10 a pattern of switches 160 may be depressed, depending on where the driver places his or her hand on the steering wheel, which exceeds the size of the thumb-sized pattern made when a thumb depresses actuators 40, 50. Under this condition, controller 60 does not activate actuators 40, 50 and controller 60 recognizes actuators 40, 50 as being in the "off" position. However, if a thumb is then placed on actuators 40, 50, controller 60 registers that a thumb-sized pattern of switches has been depressed and controller 60 will activate the actuators 40, 50 if they are depressed for at least the pre-set threshold time. When controller 60 activates actuators 40, 50, either one of actuator 40 or actuator 50 may be depressed to turn on the corresponding signal lights (not shown). If controller 60 has not activated actuators 40, 50, then depressing either of actuator 40 or actuator 50 will not turn on the corresponding signal lights.

To deactivate actuators 40, 50, both actuator 40 and actuator 50 are depressed simultaneously and held for a pre-set threshold time. Referring to FIG. 10, timer 90 of controller 60 measures the time each of actuator 40 and actuator 50 is depressed. If the measured time exceeds a pre-set threshold time, 1 second for example, then controller 60 deactivates the activated actuators 40, 50. If the measured time is less than the pre-set threshold time, controller 60 does not deactivate actuators 40, 50. The pre-set threshold time can be varied and programmed into memory 100 shown in FIG. 10 such that logic circuits 80 of FIG. 10 in controller 60 deactivate activated actuators 40, 50. It is preferred that the pre-set threshold time be about 1 second. When actuators 40, 50 are deactivated, depressing actuators 40, 50 will not turn on the corresponding turn signal lights.

When driving a motor vehicle equipped with a steering wheel that incorporates the present invention, a driver may use the vehicle's stalk switch to turn on the vehicle's turn signals. Preferably the operation of the stalk switch is not modified by incorporation of the present invention into the steering wheel, but modifications may be made without altering the concepts encompassed by the descriptions herein. The actuators 40, 50 may be used to turn on and turn off the turn signals of the motor vehicle once the controller 60 has activated actuators 40, 50 as provided herein. Thus, in a preferred embodiment, the actuators 40, 50 operate in parallel with the vehicle's stalk switch and the turn signals turn on when activated actuator 40 or activated actuator 50 is depressed and turn off when activated actuator 40 or, respectively, activated actuator 50 is released. Unlike the conventional stalk switch, which turns off when the steering wheel is rotated away from the direction of the turn, in the preferred embodiment of the present invention the turn signals only operate when one of actuator 40 and actuator 50 is depressed. In a critical or high-stress driving situation, a driver need only position his or her thumbs on the actuators 40, 50, depress both of the actuators 40, 50 and maintain them in an "on" position for a pre-determined amount of time, and thereafter operate the turn signals using only one of the actuators 40, 50. With the system and apparatus of the present invention, a turn signal cannot prematurely or accidently turn off. Once the actuators 40, 50 are activated, a turn signal is turned on by depressing one of actuators 40, 50 and it is turned off by releasing the depressed actuator.

Thus, it is apparent that there has been provided, in accordance with the present invention, a turn signal activation switch and system which is integral to the rim of a steering wheel that fully satisfies the objects, aims and advantages set forth above.

While the invention has been described in conjunction with specific embodiments thereof, it is evident that many alternatives, modifications and variations will be apparent to those skilled in the art in light of the foregoing description. Accordingly, it is intended that the present invention is not limited by the foregoing description. Rather, it includes all such alternatives, modifications and variations as set forth within the spirit and scope of the appended claims.

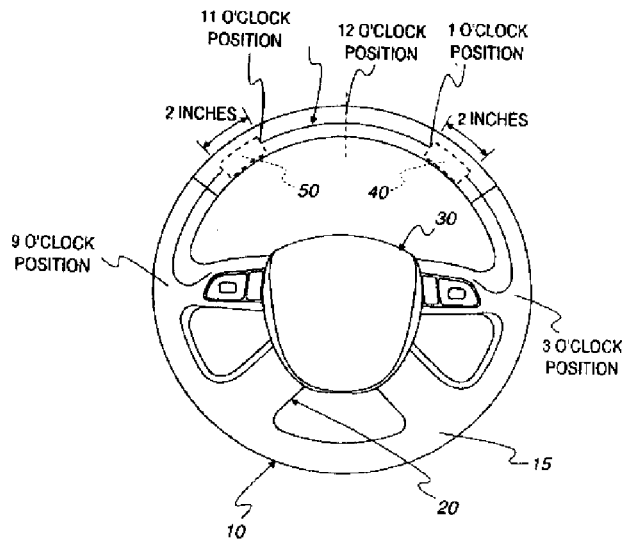

What is claimed is:

1. An integrated turn signal activation system for use with a motor vehicle steering wheel having an annular ring, the integrated turn signal activation system comprising:
   a left actuator, the left actuator attached to the steering wheel annular ring between the 9 o'clock and 12 o'clock positions on the annular ring;
   a right actuator, the right actuator attached to the steering wheel annular ring between the 3 o'clock and 12 o'clock positions on the annular ring;
   a controller, the controller connected to the left and right actuators, the controller further connected to a left side exterior light and a right side exterior light, the left side and right side exterior lights being mounted on the motor vehicle exterior;
   wherein the left actuator and the right actuator do not overlap;
   wherein the controller activates the left actuator and the right actuator when the left and the right actuators are depressed simultaneously and held for a pre-set threshold time, thus providing an activated left actuator and an activated right actuator;
   wherein the left exterior light is energized when the activated left actuator is depressed; and
   wherein the right exterior light is energized when the activated right actuator is depressed.

2. The integrated turn signal activation system of claim 1 wherein each of the right actuator and the left actuator include a switch array.

3. The integrated turn signal activation system of claim 2 wherein the controller activates the left and right actuators when thumb-sized patterns of switches in the switch array of each of the left and the right actuators are simultaneously depressed.

4. The integrated turn signal activation system of claim 1 wherein the left actuator is positioned beginning at the 11 o'clock position on the steering wheel annular ring and extends in a two inch arc towards the 9 o'clock position and further wherein the right actuator is positioned beginning at the 1 o'clock position on the steering wheel annular ring and extends in a two inch arc towards the 3 o'clock position.

5. The integrated turn signal activation system of claim 4 wherein each of the right actuator and the left actuator include a switch array.

6. The integrated turn signal activation system of claim 5 wherein the controller activates the left and the right actuators when thumb-sized patterns of switches in the switch array of each of the left and the right actuators are simultaneously depressed.

7. The integrated turn signal activation system of claim 1 wherein the pre-set threshold time ranges from about 0.5 seconds to about 5 seconds.

8. The integrated turn signal activation system of claim 1 wherein the pre-set threshold time is about 1 second.

9. The integrated turn signal system of claim 1 wherein an end of the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions.

10. The integrated turn signal system of claim 1 wherein an end of the right actuator is positioned proximal to the 3 o'clock position on the steering wheel annular ring and the opposite end of the right actuator is positioned proximal to the 12 o'clock position on the steering wheel annular ring, such that the right actuator is sized to span the distance between the 3 o'clock and 12 o'clock positions.

11. The integrated turn signal system of claim 1 further comprising means for generating an audible signal; wherein the audible signal sounds when either the left exterior light is energized when activated left actuator is depressed or when the right exterior light is energized when activated right actuator is depressed.

12. An integrated turn signal activation system for use with a motor vehicle steering wheel having an annular ring, the annular ring having a skin, the integrated turn signal activation system comprising:
 a left actuator, the left actuator attached to the steering wheel annular ring between the 9 o'clock and 12 o'clock positions on the annular ring, the left actuator covered by the skin;
 a right actuator, the right actuator attached to the steering wheel annular ring between the 3 o'clock and 12 o'clock positions on the annular ring, the right actuator covered by the skin;
 a controller, the controller connected to the left and right actuators, the controller further connected to a left side exterior light and a right side exterior light, the left side and right side exterior lights being mounted on the motor vehicle exterior;
 wherein the left actuator and the right actuator do not overlap;
 wherein the controller activates the left actuator and the right actuator when the left and the right actuators are depressed simultaneously and held for a pre-set threshold time, thus providing an activated left actuator and an activated right actuator;
 wherein the left exterior light is energized when the activated left actuator is depressed; and
 wherein the right exterior light is energized when the activated right actuator is depressed.

13. The integrated turn signal activation system of claim 12 wherein each of the right actuator and the left actuator include a switch array.

14. The integrated turn signal activation system of claim 13 wherein the controller activates the left and right actuators when thumb-sized patterns of switches in the switch array of each of the left and the right actuators are simultaneously depressed.

15. The integrated turn signal activation system of claim 12 wherein the left actuator is positioned beginning at the 11 o'clock position on the steering wheel annular ring and extends in a two inch arc towards the 9 o'clock position and further wherein the right actuator is positioned beginning at the 1 o'clock position on the steering wheel annular ring and extends in a two inch arc towards the 3 o'clock position.

16. The integrated turn signal activation system of claim 15 wherein each of the right actuator and the left actuator include a switch array.

17. The integrated turn signal activation system of claim 16 wherein the controller activates the left and the right actuators when thumb-sized patterns of switches in the switch array of each of the left and the right actuators are simultaneously depressed.

18. The integrated turn signal system of claim 12 wherein an end of the left actuator is positioned proximal to the 9 o'clock position on the steering wheel annular ring and the opposite end of the left actuator is positioned proximal to the 12 o'clock position on the steering wheel annular ring, such that the left actuator is sized to span the distance between the 9 o'clock and 12 o'clock positions.

19. The integrated turn signal system of claim 12 wherein an end of the right actuator is positioned proximal to the 3 o'clock position on the steering wheel annular ring and the opposite end of the right actuator is positioned proximal to the 12 o'clock position on the steering wheel annular ring, such that the right actuator is sized to span the distance between the 3 o'clock and 12 o'clock positions.

20. The integrated turn signal system of claim 12 wherein the left actuator and the right actuator are molded into the annular ring of the steering wheel.

\* \* \* \* \*

UNITED STATES PATENT AND TRADEMARK OFFICE
CERTIFICATE OF CORRECTION

Page 1 of 2

PATENT NO. : 8,198,996 B2
APPLICATION NO. : 12/555477
DATED : June 12, 2012
INVENTOR(S) : Adam Simon Golomb It is certified that error appears in the above-identified patent and that said Letters Patent is hereby corrected as shown below:

Title Page,
The drawing figure printed on the front page of the issued patent, "Fig. 7" is incorrect. This figure is the prior art as described in the Brief Description of the Drawings, Column 4, Line 36.

Please replace it with -- Fig. 4 --.

Signed and Sealed this
Fourth Day of December, 2012

David J. Kappos
*Director of the United States Patent and Trademark Office*

(12) United States Patent
Golomb

(10) Patent No.: US 8,198,996 B2
(45) Date of Patent: Jun. 12, 2012

(54) INTEGRATED VEHICLE TURN SIGNAL SYSTEM AND APPARATUS

(76) Inventor: Adam Simon Golomb, Chicago, IL (US)

( * ) Notice: Subject to any disclaimer, the term of this patent is extended or adjusted under 35 U.S.C. 154(b) by 420 days.

(21) Appl. No.: 12/555,477

(22) Filed: Sep. 8, 2009

(65) Prior Publication Data
US 2011/0057785 A1 Mar. 10, 2011

(51) Int. Cl.
B60Q 1/34 (2006.01)
(52) U.S. Cl. ......... 340/475; 340/465; 340/468; 340/471
(58) Field of Classification Search ............. 340/475
See application file for complete search history.

(56) References Cited

U.S. PATENT DOCUMENTS

| | | | |
|---|---|---|---|
| 1,651,540 A * | 12/1927 | Park | 340/465 |
| 2,068,632 A | 1/1936 | Stiles | |
| 2,291,159 A | 7/1942 | Jacobi | |
| 4,567,217 A | 1/1986 | Yamazaki et al. | |
| 5,198,629 A | 3/1993 | Hayashi et al. | |
| 5,614,884 A | 3/1997 | Evans | |
| 5,666,102 A | 9/1997 | Lahiff | |
| 5,762,853 A | 6/1998 | Harris et al. | |
| 5,823,666 A * | 10/1998 | Kingsolver | 362/488 |
| 6,144,297 A * | 11/2000 | Donner | 340/475 |
| 6,961,644 B2 | 11/2005 | Mercier et al. | |
| 2006/0044129 A1 * | 3/2006 | Patel | 340/475 |

OTHER PUBLICATIONS

"Hands-On: A Practical Measure of the Perceived Risk of the Driving Context," J.A. Thomas & D. Walton Opus Central Laboratories; Transit NZIHT 7th Annual Conference, pp. 1-10, 2005.
"A Large-Area, Flexible Pressure Sensor Matrix With Organic Field-Effect Transistors for Artificial Skin Applications." Takao Someya et al, PNAS Jul. 6, 2004, vol. 101, No. 27, pp. 9966-9970.
"Luna Innovations Fiber Optic Pressure Sensor," Trevor Rice, Luna Innovations (4 pages), Nov. 11, 2005.
Web page printout 5 DOF Haptic Wand-Speciality (1 page), 2005.
RLP Engineering, Intellitum "A Brief History of Turn Signals" www.rlpengineering.com/history.htm (2 pages), 2008.
Tapecon Membrane Switch Division, Tapecon, Inc.; product marketing brochure (16 pages), Apr. 3, 2006.
SmartMotorist.com. "Where to Put Hands on the Steering Wheel?", (4 pages), 2009.
Master Molded Products Corporation; In-Mold Technology; product marketing brochure (6 pages), 2009.
International Search Report and the Written Opinion of the International Searching Authority, Oct. 25, 2010.

* cited by examiner

Primary Examiner — George Bugg
Assistant Examiner — Kerri McNally
(74) Attorney, Agent, or Firm — Reed Smith, LLP

(57) ABSTRACT

The present provides a system which integrates motor vehicle turn signal operation into actuators located in the rim of a motor vehicle steering wheel. The actuators of the system of the present invention, one for controlling the right-hand turn signal and one for controlling the left-hand turn signal, are located in an arc segment of the steering wheel defined by the three o'clock and 12 o'clock positions for the right-hand actuator and the nine o'clock and 12 o'clock positions for the left-hand actuator. The actuators may operate in parallel with a conventional stalk switch and only turn on the respective turn signal lights when activated and subsequently depressed. The turn signal lights turn off when the actuators are released. The integrated turn signal system of the present invention further provides for turn signal operation which does not require a driver to remove his or her hands from the steering wheel.

20 Claims, 13 Drawing Sheets